G. FLEMING.
SYSTEM FOR SUPPLYING DRINKING WATER.
APPLICATION FILED SEPT. 21, 1907.
920,558.  Patented May 4, 1909.
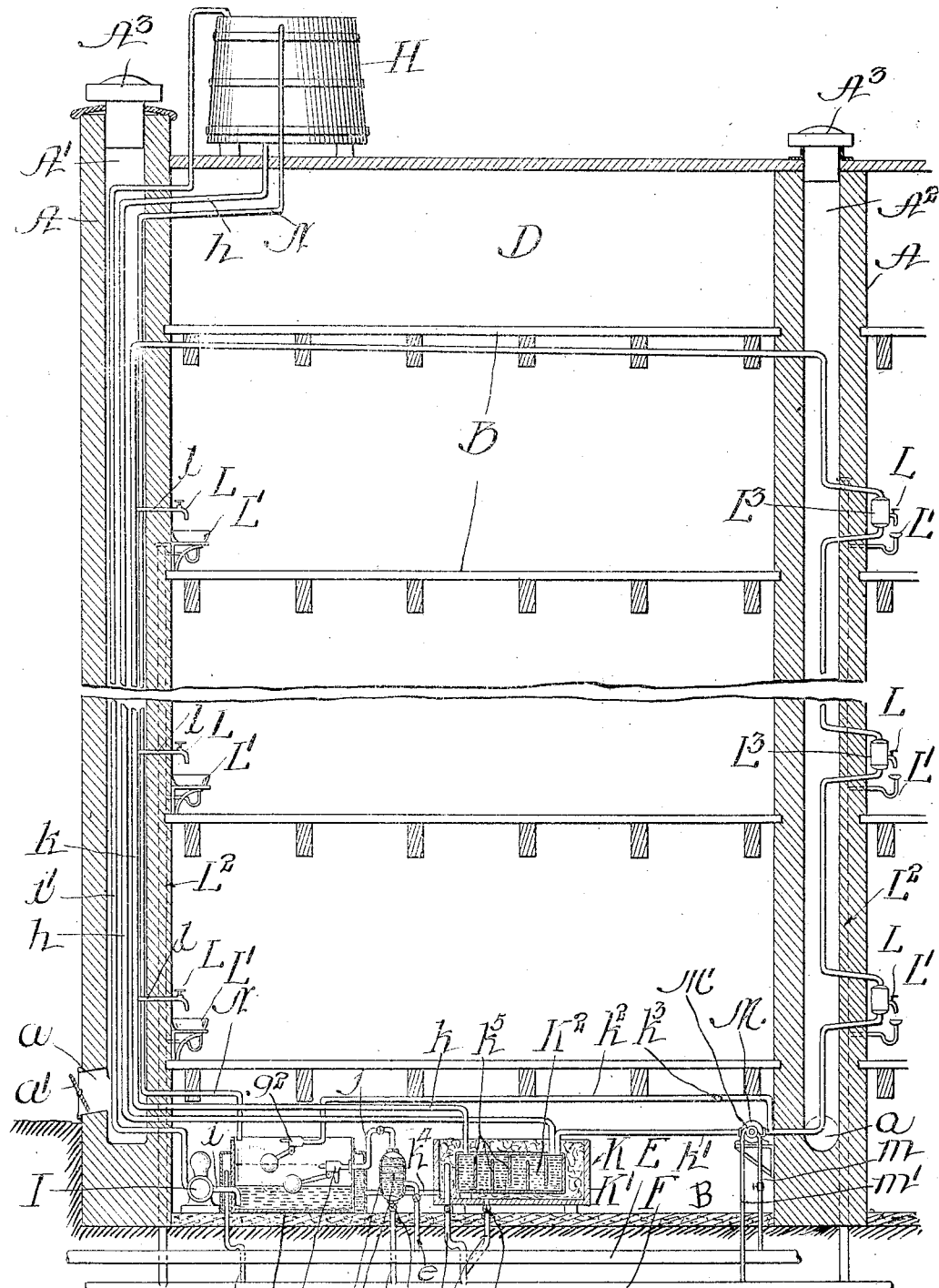
Witnesses:  Inventor
George Fleming
by Poole & Brown Attys

UNITED STATES PATENT OFFICE.

GEORGE FLEMING, OF CHICAGO, ILLINOIS.

SYSTEM FOR SUPPLYING DRINKING-WATER.

No. 920,558.   Specification of Letters Patent.   Patented May 4, 1909.

Application filed September 21, 1907. Serial No. 393,895.

*To all whom it may concern:*

Be it known that I, GEORGE FLEMING, a citizen of the United States, and a resident of Chicago, in the county of Cook and State of Illinois, have invented certain new and useful Improvements in Systems for Supplying Drinking-Water; and I do hereby declare that the following is a full, clear, and exact description thereof, reference being had to the accompanying drawings, and to the letters of reference marked thereon, which form a part of this specification.

This invention relates to a system for supplying drinking or other water, which may be cooled and filtered, to the different parts of a building, and the invention consists in the matters hereinafter more particularly set forth and pointed out in the appended claims.

The invention may be better understood by reference to the accompanying drawing which shows a vertical section through the walls and floors of a building equipped with my improved system.

As shown in said drawings, A, A designate two vertical walls of a building, and B, B designate the several floors thereof.

C designates the basement of the building and D designates an upper compartment which may constitute the attic of the building.

The two walls A, A are provided with vertical passages or flues $A^1$, $A^2$ in which are located parts of the apparatus to be hereinafter described. Said flues are equipped at their upper ends with ventilators $A^3$ and are provided at their lower ends with air inlet openings $a$, which may be provided with controlling valves $a^1$, shown at the lower end of the flue $A^1$.
E designates a water supply main and F a sewer main below the floor of the basement.

G designates a receiving tank located in the basement which receives water from the water main E and H designates a reservoir located above the highest point to which it is desired that water shall be supplied.

I designates a force pump for lifting the water from the receiving tank to the reservoir H. The intake pipe $i$ of said pump dips into the body of water in said receiving tank and the water is lifted by said pump through a pipe $i^1$ located in the shaft or flue $A^1$ and connected at its lower end with the outlet side of said pump and discharging at its upper end into the top of said reservoir. Water may be delivered directly from the pressure water main E to said receiving tank. As herein shown, however, a filter J is interposed between said main and the receiving tank to filter the water before its delivery to the tank. Water is delivered to said filter through a pipe $e$ which rises from and communicates with said pressure main E.

K designates a refrigerator or ice-box located in the basement C.

Filtered water is discharged from the filter under the pressure of the main E through a pipe $j$ leading thereinto from the top of said filter. Said pipe $j$ is provided within said tank with a float controlled valve $g$ which is normally open and automatically closes to shut off the supply of water to the tank when the water rises above a predetermined level in the tank, thereby automatically maintaining such level regardless of the pressure of the water supply and the withdrawal of the water from the tank by the pump I.

From the bottom of the reservoir H a pipe $h$ leads downwardly through said flue $A^1$ into one end of the refrigerator K and from the opposite end of said refrigerator a pipe $k$ leads upwardly through said flue $A^1$ to the upper part of the building, thence across to the opposite flue $A^2$ near the upper floor B, and descends through said latter flue to the basement and terminates in a horizontal portion $k^1$ which enters the refrigerator box K at a point closely adjacent to the lower end of the pipe $h$. At various points in its length the pipe $k$ is provided with branch pipes $l$ and draw-off cocks L L by means of which water may be drawn from the system as required for use. Below said draw-off cocks are arranged drip bowls or sinks $L^1$ provided with trapped drain pipes which lead into waste pipes $L^2$ which connect at their lower ends with the sewer main F. Certain of the branch pipes $l$ are shown as equipped with ornamental glass tanks $L^3$, located in the adjacent rooms of the building. The pipe $k$ and the refrigerator or ice-box K constitute a closed distributing circuit which is supplied with water from the reservoir H through the pipe $h$ at the said refrigerator, water being supplied by gravity from the reservoir to the circuit as the water is withdrawn from said circuit for use.

Means are provided for maintaining a positive circulation of the water in the distributing circuit in order to cool the water by its passage through the refrigerator. Said means consists, as herein shown, of a pump M included in the circulating pipe $k$, it being herein shown as contained in the horizontal portion $k^1$ of the pipe located in the basement C. The pump may be driven by any suitable motor, as for instance, a water motor $M^1$, when conditions permit, supplied with water from the main E through a pipe $m$. A drain pipe $m^1$ leads from the motor to the sewer F.

As a further means for maintaining a circulation of water through said circuit, which may be used separately or as an auxiliary to the pump, water may be slowly diverted from the lower part of the circuit on the receiving side of the refrigerator to the tank G or other receptacle and pumped therefrom to the reservoir from time to time as occasion requires. The water thus diverted from the circuit is replaced by water from the reservoir H, thus maintaining or assisting to maintain a circulation of water in the system. When such circulating means is used auxiliary to the pump M it may take the form of a branch pipe $k^2$ provided with a valve $k^3$ leading from the pipe $k^1$ adjacent to the intake side of the pump and discharging at its other end into the tank G. By properly adjusting the valve $k^3$ water is allowed to leak slowly from the lower part of the distributing circuit through the pipe $k^2$ and around the refrigerator into the receiving tank G from whence it is pumped to the reservoir from time to time. Said pipe $k^2$ is provided within the receiving tank G with a float controlled valve $g^2$ located at a level higher than the float controlled valve $g$. Said valve is normally open but closes when the water reaches the level indicated by the dotted line and cuts off the further leakage of water from said circuit to the tank. The rising of the float gives notice to the engineer or to the person who has charge of the pump I to pump water from said receiving tank into the reservoir until the level of the water in the tank is lowered sufficiently to allow the float controlled valve $g^2$ to open, thereby reestablishing leakage of the water from said circuit to said tank. The valve $k^3$ is adjusted to permit the water to leak from the circuit to the tank slowly so that ample notice may be given to avoid the complete closing of the leak pipe $k^2$, and to avoid the necessity of pumping the water back into the tank H at frequent intervals.

An overflow pipe N leads from the upper end of the reservoir H downwardly through the shaft $A^1$ and discharges at its lower end into the receiving tank G whereby the person having charge of the pump I may know when the reservoir is filled to the proper level.

In order that the water in the receiving tank G may be preliminarily cooled, said tank is constructed with double walls between which is afforded a cooling space which is furnished with water from the melting ice in the refrigerator box K through a pipe $k^4$. Said cooling water space is drained into the sewer main through a drain pipe $g^4$.

The refrigerator K consists of an outer casing $K^1$ adapted to receive ice, and an inner closed chamber or tank $K^2$ suitably supported therein and arranged for the passage of water therethrough. Said inner chamber $K^2$ is divided by vertical partitions $k^5$ into a number of compartments, and said partitions are so arranged that alternate ones leave spaces between their top and bottom margins and the top and bottom walls, respectively, of the tank, so that water entering the tank at the top of one of the end compartments passes to the other end compartment of the device in a zig-zag path, from which latter compartment the water is delivered to the receiving end of the distributing pipe $k$. A drain pipe $k^6$ communicating with the sewer pipe F opens into the ice compartment of the refrigerator box at a point above the bottom wall thereof, whereby water from the melting ice is drained to the level of the upper end of said pipe. A second drain pipe $k^7$, provided with a valve $k^8$, leads from the bottom of said ice compartment to the sewer, whereby all the water may be drained from the ice compartment when desired.

The filtering device J consists of an upright cylindric casing having in its upper part horizontally arranged porous partitions $J^1$ between which are placed a filtering medium, such as sand, gravel or charcoal. The inlet opening of the filter with which the filter inlet pipe $e$ is connected opens immediately below the lowermost of said partitions. The filter casing has an outlet opening at the top of the tank for communication with the pipe $j$ which leads to the receiving tank, as before described. From the bottom of the filter casing J a drain pipe $j^1$ leads to the sewer pipe F. Said drain pipe is provided with a valve $j^2$ which is normally closed. The practical advantage of this construction lies in the fact that solid matter and impurities which are separated from the water by its passage through the lowermost of the horizontal partitions, or the first layer of filtering material, instead of adhering to said partition is continually washed therefrom by the inflow of water through the inlet pipe $e$ and settles to the bottom of the filter casing from which it may be occasionally withdrawn by opening the valve $j^2$ in the drain pipe $j^1$.

I claim as my invention:—

1. The combination with an elevated water reservoir and a closed circuit receiving water from said reservoir, of a leak passage discharging water from the lower part of said circuit, a tank into which said passage discharges, automatic means for cutting off tl flow of water through said passage to said tank, and means for raising water from said tank to said reservoir.

2. In a system for supplying water, the combination with a source supplying water, a reservoir located above the highest level at which the water is to be distributed, and a pump receiving water from said source of supply and delivering it to said reservoir, of a closed distributing circuit receiving water from said reservoir and provided with a plurality of draw-off cocks, a leak pipe receiving water from the lower part of said circuit, a tank into which the pipe discharges, and automatic means for cutting off the flow of water through said pipe to said tank, said pump operating to lift the water from said tank to said reservoir.

3. In a system for supplying water, the combination with a source supplying water, a reservoir located above the highest level at which the water is to be distributed, and a pump receiving water from said source of supply and delivering it to said reservoir, of a closed circuit receiving water from said reservoir and provided with a plurality of draw-off cocks, a pump for maintaining a positive circulation in said circuit, a leak pipe leading from said closed circuit, a tank into which said pipe discharges, and a float actuated valve within said tank operating upon the rise of water in the tank to cut off the flow of water through said pipe to the tank, said first mentioned pump operating to lift the water from said tank to said reservoir.

4. In a system for supplying water, the combination with a source supplying water and a reservoir elevated above the highest level at which the water is to be distributed, of a receiving tank into which the water is delivered from said source of supply, a float actuated valve for controlling the delivery of water from said source to said tank, means for raising water from said tank to the reservoir, a closed distributing circuit receiving water from said reservoir and provided with a plurality of draw-off cocks, a pump for maintaining a positive circulation of water through said circuit, a leak pipe receiving water from the lower part of said circuit and discharging into said receiving tank, and automatic means for cutting off the flow of water through said pipe to the tank.

5. In a system for supplying water, the combination with a source supplying water, and a storage reservoir located above the highest level at which the water is to be distributed, of a receiving tank into which water is delivered from said source of supply, a float actuated valve for controlling the supply of water to said tank, a pump for raising the water from said tank to the reservoir, a closed circuit receiving water from said reservoir and provided with a plurality of draw-off cocks, means for maintaining a positive circulation of water in said closed circuit, and an overflow pipe leading from the top of said storage reservoir and discharging into said receiving tank.

In testimony that I claim the foregoing as my invention I affix my signature in the presence of two witnesses, this 12th day of September A. D. 1907.

GEORGE FLEMING.

Witnesses:
A. M. BUNN,
T. H. ALFREDS.